United States Patent [19]

Grunwald

[11] Patent Number: 5,017,002

[45] Date of Patent: May 21, 1991

[54] OVERHEAD PROJECTOR

[76] Inventor: Peter H. Grunwald, Schlattstrasse 215, FL 9491 Ruggell, Liechtenstein

[21] Appl. No.: 58,155

[22] Filed: Jun. 4, 1987

[30] Foreign Application Priority Data

Jun. 5, 1986 [DE] Fed. Rep. of Germany ....... 3618992

[51] Int. Cl.⁵ ..................... G03B 21/132; G03B 21/16
[52] U.S. Cl. ............................... 353/66; 353/DIG. 4; 353/57
[58] Field of Search .................... 353/57–61, 353/65–67, DIG. 3, DIG. 4

[56] References Cited

FOREIGN PATENT DOCUMENTS 3410002 9/1985 Fed. Rep. of Germany ... 353/DIG. 3

Primary Examiner—Harry N. Haroian
Attorney, Agent, or Firm—Robert E. Burns; Emmanuel J. Lobato

[57] ABSTRACT

An overhead projector comprises a hollow base comprising a writing plate and a reflective Fresnel lens below the writing plate and an air space below the Fresnel lens. A hollow support arm projecting up from one side of the base carries a projection head having an objective lens and deflection mirror. A lamp mounted in the transition between the support arm and the projection head directs light on the writing plate. The hollow support arm is in communication with the interior of the base to provide a cooling air flow path between openings in the base at the side opposite the support arm and openings in the support arm adjacent the projection head, behind which latter openings a blower is mounted. Ribs in the hollow base define air flow distributors for effectively cooling the Fresnel lens and electronic circuit components mounted in the hollow base.

7 Claims, 1 Drawing Sheet

OVERHEAD PROJECTOR

FIELD OF INVENTION

The invention relates to an overhead projector comprising a base accommodating a writing plate and Fresnel lens and provided with air channels, a support arm, mounted on the base, for a projection head having an objective lens and a deflection mirror and also a light source for illuminating the writing plate. In the projection head or in the support arm there is a blower which promotes a flow of cooling air through the air channels of the base plate and through the projection head and support arm to cool the light source and the electronic power supply circuitry in the base plate.

BACKGROUND OF THE INVENTION

There is known an overhead projector of which the support arm is bent and has at the bend a blower which produces a flow of cooling air through the support arm in which a part of the electronic power supply circuitry is accommodated and which at the same time produces a flow of cooling air in a second flow path past the objective in the projection head and light source in the projection head or horizontal portion of the support arm.

There is also known another overhead projector in which, for cooling of the Fresnel lens below the writing plate, the base plate is made hollow and a ventilator produces a flow of cooling air through the base plate beneath the Fresnel lens.

The accommodation of long, straight circuit boards on which the electronic components of the power supply circuitry are mounted in a wide straight support arm, presents no difficulty. However, if the support arm is bent and/or of such small cross section that the circuit boards of the electronic components cannot be accommodated in the support arm, there is difficulty in accommodating the power supply circuitry.

In another known embodiment of an overhead projector, the power supply circuitry is arranged in a rear part of the base plate in a region beyond the writing plate and directly adjacent the support arm. However, this arrangement requires a special housing for the power supply circuitry. This arrangement of the power supply circuitry has been found to be unsightly. Moreover, the power supply circuitry occupies space which could well be used as a storage surface for objects that are to be successively projected. Also, this arrangement of the power supply circuitry deprives the user of the overhead projector of a part of his viewing surface.

SUMMARY OF THE INVENTION

The invention avoids these objections. It is an object of the invention to accommodate the electronic power supply circuitry outside of the support arm in such manner that it is arranged for good cooling by an airstream but is so arranged that its accommodation requires no additional room.

In accordance with the invention, the electronic components of the power supply and control circuitry are accommodated in air channels of the base plate below the writing plate and Fresnel lens.

By this accommodation of the circuitry, the electronic components require no additional room as they are accommodated in the already availible space of the hollow base plate. Through their accommodation in air channels inside the hollow base plate, the electronic units are effectivlely cooled during operation of the overhead projector. Moreover, in this position the electronic components are much more accessible than when they are accommodated in the support arm since merely by removing the writing plate and Fresnel lens, or by removing the bottom part of the base plate, the electronic components are freely accessible and can easily be replaced or repaired in case this becomes necessary.

It is advantageous when the electronic components are mounted on at least one circuit board and when this circuit board is arranged between ribs defining air flow channels. This construction permits it to be very flat so that the electronic components are well accommodated inside the ground plate. Moreover, this construction has the advantage that the entire circuit board is easily replacable.

It has been found advantageous when the airflow channels inside the base plate are formed by ribs which assure uniform distribution of the cooling air in the interior of the base plate. Moreover, it is advantageous when at least one of the ribs defining the airflow channels is interrupted in order to accommodate electronic components on a circuit board. This makes it possible for the cooling air better to flow over and cool the individual electronic components.

BRIEF DESCRIPTION OF DRAWINGS

The nature objects and advantages of the invention will be more fully set out in the following description of a preferred embodiment shown by way of example in the accompaning drawings in which.

DESCRIPTION OF PREFERRED EMBODIMENT

Figure 1:
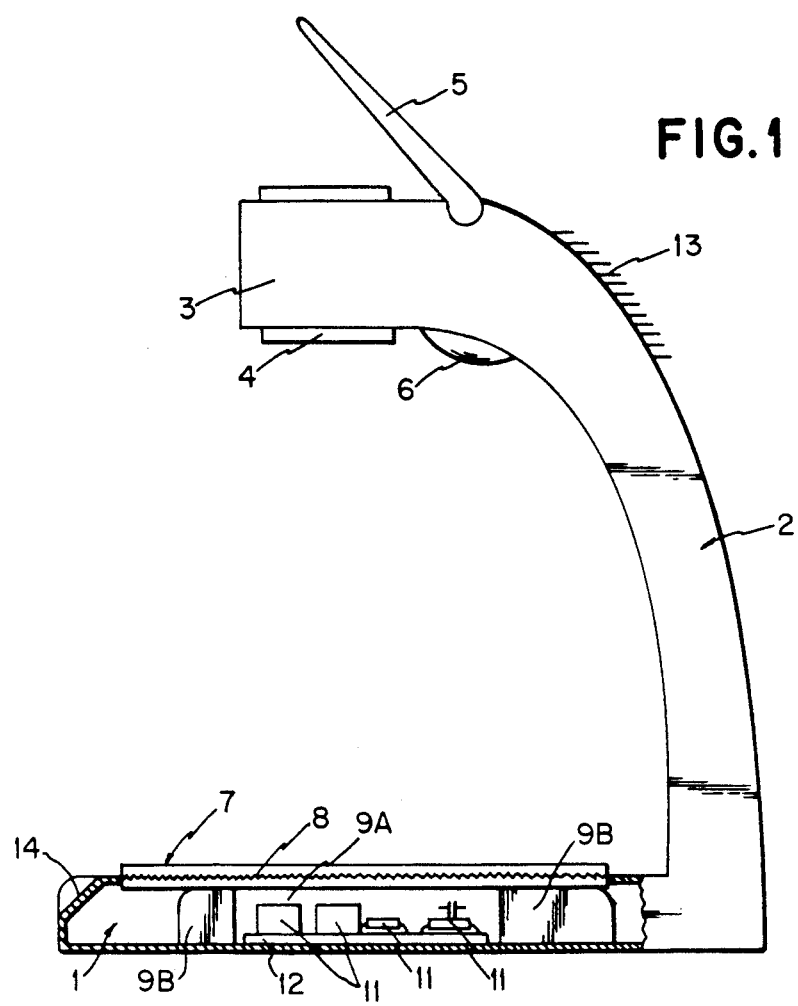
FIG. 1, is a side elevation of an overhead projector in accordance with the invention with a portion of the base plate shown in secion, and, FIG. 2, is a top plan view of the base plate of the overhead projector after removal of the writing plate and Fresnel lens.
Figure 2:
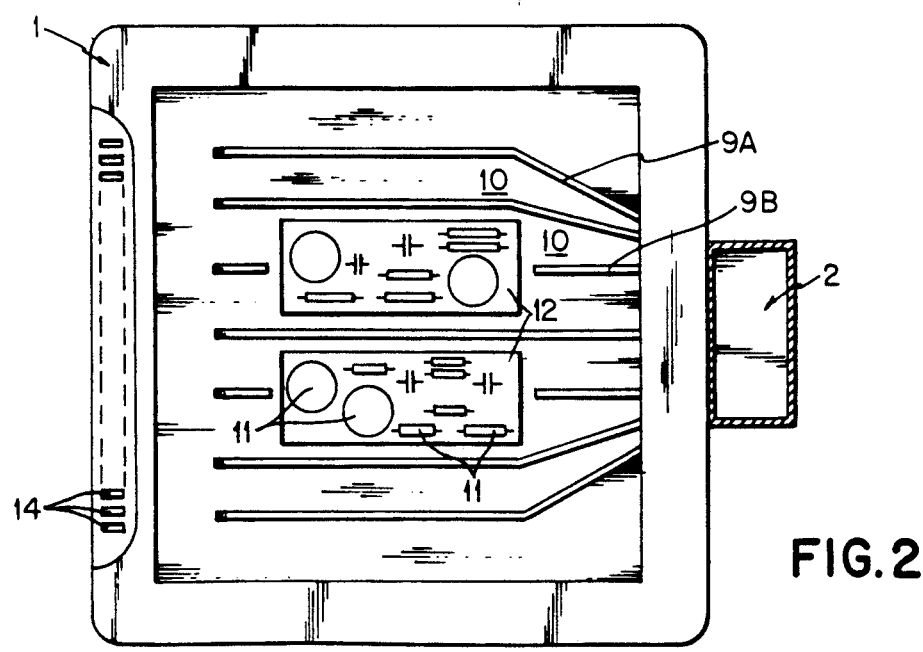

The overhead projector, shown by way of example in the drawings, comprises a base plate 1, on which is mounted a hollow support arm 2, which extends up from one side of the base plate and carries a projection head 3. The projection head 3, accommodates an objective lens 4, and has a hinged deflection mirror 5, mounted in inclined position above the objective lens 4, so as to direct light rays from the objective lens 4, approximately horizontally onto a screen. As seen in FIG. 1, the hollow support arm 2 is curved so as to blend smoothly into the horizontally disposed projection head 3. At the transition of the support arm 2 into the projection head 3, a light source 6 is arranged in the projection head 3, or the support arm 2, in position to direct light rays onto the base plate.

The upper surface of the base plate 1, is formed by a writing plate 7, under which there is arranged a Fresnel lens 8. In the interior of the hollow base plate, between the Fresnel lens 8, and a bottom 15, there are provided ribs 9, defining airflow channels 10 between the ribs. The ribs 9 include continuous ribs 9A, and between these there are interrupted ribs 9B. Between continuous ribs 9A, on two opposite sides and at the place of interruption of the interrupted ribs 9B, there are arranged electronic components 11 of the power supply and control circuitry which are mounted on circuit boards 10. The electronic components comprise, for example, transformers, rectifiers, capacitors, resistors and transistors. As seen in FIG. 1, the electronic components are spaced downwardly, from the Fresnel lens to provide an air-flow space between the Fresnel lens and the electronic components. The writing plate 7 and Fresnel lens 8, or the bottom 15, are removable so as to provide access to the electronic components in the hollow base.

In the hollow support arm 2, behind air openings 13, there is provided a blower 16, for producing airflow through the support arm which, at its junction with the base plate, has a wide air opening through which cooling air can flow. At the side opposite the support arm 2, the base plate 1 is provided with air openings 14 to provide for airflow through the airflow channels 10 and hollow support arm 2, between the air openings 14 in the base plate and the air openings 13 in the support arm. The ribs 9, defining the airflow channels 10, provide uniform distribution of the airflow to assure that the electronic components 11 and the Fresnel lens are effectivly cooled. The ribs defining the airflow channels include outer ribs 9A, which at the side of the base plate adjacent the support arm, are bent inwardly so as to provide flow between openings 14 and the opening into the hollow support arm. The interruption of the ribs 9B provides for mounting of the circuit boards 12, in such manner that electronic components on each of the circuit boards are cooled by the airflow through two airflow channels 10. The hollow support arm which is in communication with the hollow base plate provides a conduit for conductors connecting circuitry in the base with the projection head and blower. The blower is operable to draw air in through the air opening 14 of the base plate and through the projection head and expel it through the openings 13. Alternatively, the blower 16, is operable to draw in air through the opening 13, and direct it to the projection head and to the hollow base plate where the air flows through the airflow channels 10 and is discharged through the air openings 14.

What I claim is:

1. An overhead projector comprising, a hollow base comprising a writing plate, a reflective Fresnel lens below said writing plate and a botto mspaced downwardly from said Fresnel lens with an air space between said bottom and said Fresnel lens,
    a hollow support arm extending up from one side of said hollow base, the interior of said hollow arm being in communication with said air space of said hollow base,
    a projection head and light source mounted on said hollow support arm above said base, said projection head comprising an objective lens and a deflection mirror and said light source directing light onto said writing plate and Fresnel lens,
    electronic elements comprising power supply and control circuitry of said projector disposed in said space in said base below said writing plate and Fresnel lens,
    said base having air openings in a side thereof opposite said support arm and said support arm having air openings adjacent said projection head, and
    means for producing air flow between said air openings of said base and said air openings of said support arm to cool said electronic elements, Fresnel lens and writing plate,
    a plurality of dividers extending between said air openings of said base and said support arm to divide said space of said base into a pluraliyt of air flow channels extending from said air openings of the base to said support arm said electronic elements being disposed in said air flow channels in position to be cooled by air flowing from said air openings to said support arm.

2. An overhead projector according to claim 1, in which downstream end portions of outermost dividers are bent inwardly to define air flow channels that converge to said support arm.

3. An overhead projector according to claim 1, in which said electronic elements comprise elements mounted on at least one circuit board and in which at least one of said dividers is interrupted to provide a space accommodating said circuit board.

4. An overhead projector according to claim 1, in which said means for producing air flow comprises a blower positioned to draw air in through said air openings in said base and over said electronic elements and to draw air in over said light source and to discharge air through said air openings in said support arm.

5. An overhead projector according to claim 1, in which said bottom is removable to afford access to said electronic elements.

6. An overhead projector according to claim 1, in which said writing plate and Fresnel lens are removable to afford access to said electronic elements.

7. An overhead projector according to claim 1, in which said electronic elements are spaced downwardly from said Fresnel lens to leave an air-flow space between said Fresnel lens and said electronic elements.

* * * * *